US010748722B2

(12) United States Patent
Horiuchi et al.

(10) Patent No.: US 10,748,722 B2
(45) Date of Patent: Aug. 18, 2020

(54) DARK-CURRENT-CIRCUIT INTERRUPTION STRUCTURE AND ELECTRICAL JUNCTION BOX INCLUDING SAME

(71) Applicant: SUMITOMO WIRING SYSTEMS, LTD., Mie (JP)

(72) Inventors: Toshiyuki Horiuchi, Mie (JP); Daisuke Matsuura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/265,034

(22) Filed: Feb. 1, 2019

(65) Prior Publication Data

US 2019/0244774 A1 Aug. 8, 2019

(30) Foreign Application Priority Data

Feb. 8, 2018 (JP) .................................. 2018-021059

(51) Int. Cl.
| | |
|---|---|
| *H01H 15/10* | (2006.01) |
| *H02B 1/48* | (2006.01) |
| *H01H 15/24* | (2006.01) |
| *H01H 15/06* | (2006.01) |
| *B60R 16/023* | (2006.01) |

(52) U.S. Cl.
CPC ......... *H01H 15/10* (2013.01); *B60R 16/0238* (2013.01); *H01H 15/06* (2013.01); *H01H 15/24* (2013.01); *H02B 1/48* (2013.01); *H01H 2203/034* (2013.01); *H01H 2205/002* (2013.01); *H01H 2231/026* (2013.01)

(58) Field of Classification Search
CPC ........ H01H 15/10; H01H 15/06; H01H 15/24; H01H 2205/002; H01H 2203/034; H01H 2231/026; H01H 85/22; H01H 85/08; B60R 16/0238; H02B 1/48

USPC ................. 200/51 R, 51.09, 51.02, 253.1
See application file for complete search history.

(56) References Cited

U.S. PATENT DOCUMENTS

| | | | |
|---|---|---|---|
| 2016/0049780 A1* | 2/2016 | Kawamura | .......... H05K 5/0247 174/541 |
| 2016/0050779 A1* | 2/2016 | Kawamura | .............. H02G 3/18 361/732 |
| 2018/0229673 A1* | 8/2018 | Nakano | ............... B60R 16/0207 |

FOREIGN PATENT DOCUMENTS

JP          07-169382          7/1995

* cited by examiner

*Primary Examiner* — Edwin A. Leon
*Assistant Examiner* — Lheriren Mae A Caroc
(74) *Attorney, Agent, or Firm* — Greenblum & Bernstein, P.L.C.

(57) ABSTRACT

Provided is a novel dark-current-circuit interruption structure that can stably maintain the state of engagement of an engaging portion of a conductive component holder with an engaged portion of a case, while reducing the size of the case, and an electrical junction box including the same. A conductive component is formed by a plate metal fitting, a conductive component holder 48 includes elastic projecting pieces and engaging portions that are provided on each of a pair of side walls that are opposingly positioned with a gap between the plate metal fitting and each of the side walls, and the case includes engaged portions with which the engaging portions are to be engaged. When attaching the conductive component holder to the case, the engaging portions and the engaged portions are configured to come into contact with each other to cause the elastic projecting pieces 68 and 76 to elastically deform.

4 Claims, 11 Drawing Sheets

DARK-CURRENT-CIRCUIT INTERRUPTION STRUCTURE AND ELECTRICAL JUNCTION BOX INCLUDING SAME

TECHNICAL FIELD

The present invention relates to a dark-current-circuit interruption structure that interrupts a conductive component for a dark current circuit provided in an automobile electrical junction box or the like, and an electrical junction box including the same.

BACKGROUND ART

Conventionally, a dark-current-circuit interruption structure as described in JP H7-169382A, for example, may be provided for an electrical junction box or the like mounted on an automobile, such as a junction box or a fuse box. That is, an automobile electric/electronic system is provided with a circuit (hereinafter referred to as a "dark current circuit") that constantly consumes power, such as a clock. For the purpose of preventing exhaustion of the battery when operation is suspended for a long period of time, for example, when a vehicle is exported, a dark current fuse, which is a conductive component that conductively connects such a circuit, needs to be removed from the dark current circuit.

Therefore, by using the dark-current-circuit interruption structure as described in JP H7-169382A, a fuse holder serving as a conductive component holder for holding the dark current fuse can be slidably displaced in the insertion/removal direction of a connection terminal of the dark current circuit, and the dark current fuse can be held so as to be switched between a connection position at which the dark current fuse is connected to the dark current circuit and a disconnection position at which the dark current fuse is disconnected from the dark current circuit.

However, for a dark-current-circuit interruption structure having such a conventional configuration, there is a need to switch the position of the conductive component holder relative to the case by causing engaging portions at distal ends of a pair of elastic projecting pieces respectively formed on a pair of opposing side walls of the conductive component holder to move over engaged portions provided on the case, when attaching the conductive component holder to the disconnection position in a case in which the dark current circuit is accommodated, or when switching the conductive component holder from the disconnection position to the connection position. During such a move-over operation, the pair of elastic projecting pieces deform so as to bend outward of the conductive component holder. Accordingly, a region for allowing the pair of elastic projecting pieces to undergo bending deformation needs to be secured on the outer side of the conductive component holder accommodated in the case, thus posing an inherent problem in that it is difficult to reduce the size of the case.

In this respect, it is conceivable to save space by omitting one of the pair of elastic projecting pieces. However, when only one of the side walls of the conductive component holder includes a lock mechanism formed by an engaging portion and an engaged portion, the conductive component holder tends to be inclined relative to the case due to a reaction force of the lock mechanism. As a result, the contact region between the engaging portion and the engaged portion is reduced, and the conductive component holder is likely to come loose from/come out of the case.

JP H7-169382A is an example of related art.

SUMMARY OF THE INVENTION

The present invention has been made in light of the above-described circumstances, and a problem to be solved by the invention is to provide a novel dark-current-circuit interruption structure that can stably maintain the state of engagement between engaging portions of a conductive component holder and engaged portions of a case, while reducing the size of the case, and an electrical junction box including the same.

A first aspect of the present invention relating to a dark-current-circuit interruption structure is directed to a dark-current-circuit interruption structure including a lock mechanism configured to: mount, to a case that accommodates a dark current circuit, a conductive component holder that holds a conductive component that conductively connects the dark current circuit such that the conductive component holder can be displaced relative to a direction of insertion and removal of the conductive component into and from a connection terminal of the dark current circuit; and to hold the conductive component holder so as to be switchable between a connection position at which the conductive component is connected to the dark current circuit and a disconnection position at which the conductive component is disconnected from the dark current circuit, the lock mechanism including an engaging portion provided on an elastic projecting piece formed on the conductive component holder, and an engaged portion that is provided on the case, and with which the engaging portion is to be engaged. The conductive component is formed by a plate metal fitting, the conductive component holder includes the elastic projecting piece and the engaging portion that are provided on each of a pair of side walls opposingly positioned on opposite sides in a thickness direction of the plate metal fitting with a gap between the plate metal fitting and each of the side walls, the case includes, on an inner side of each of a pair of wall portions that are respectively opposed to the pair of side walls, an engaged portion with which the engaging portion is to be engaged, and, when attaching the conductive component holder to the case, the engaging portions and the engaged portions are configured to come into contact with each other to cause the elastic projecting pieces to be elastically deformed in a direction in which the elastic projecting pieces approach each other, thus allowing insertion of the conductive component holder into the case, and the engaging portions are configured to be engaged with the engaged portions by elastic restoration of the elastic projecting pieces, thus forming the lock mechanism.

According to the present aspect, the conductive component is formed by a plate metal fitting, and, therefore, there is a larger internal space in the conductive component holder as compared with a conductive component formed by a fuse as in the conventional structures. With this internal space, a region for allowing bending deformation of the elastic projecting pieces can be secured. Therefore, when attaching the conductive component holder to the case in which the dark current circuit is accommodated, the elastic projecting pieces are deformed so as to bend in the direction in which the elastic projecting pieces approach each other, or in other words, inward of the conductive component holder. Accordingly, the region that has been conventionally required no longer needs to be provided on the outer side of the case, and it is thus possible to advantageously reduce the size of the case.

As a result, the lock mechanism formed by the engaging portion provided on the elastic projecting piece and the engaged portion provided on the wall portion of the case can be provided on each of the pair of opposing side walls of the conductive component holder, or in other words, a side of the pair of opposing side walls that are oppposingly positioned on opposite sides in the thickness direction of the plate metal fitting serving as the conductive component, without increasing the size of the case. Accordingly, it is possible to stably maintain the state of engagement between the engaging portions of the conductive component holder and the engaged portions of the case, while reducing the size of the case.

According to a second aspect of the present invention relating to a dark-current-circuit interruption structure, the engaging portions each include a first engaging portion and a second engaging portion, and the engaged portions each include a first engaged portion with which the first engaging portion is to be engaged, and a second engaged portion with which the second engaging portion is to be engaged on an inner side of at least one of the wall portions, at the disconnection position, the first engaging portion is configured to be engaged with a lower surface of the first engaged portion in a state in which the first engaging portion rides over the first engaged portion and is elastically restored, thus preventing the conductive component holder from coming out of the case, and the second engaging portion is configured to be placed on the second engaged portion from above, thus positioning the conductive component holder at the disconnection position relative to the case, and, at the connection position, the second engaging portion is configured to be engaged with a lower surface of the second engaged portion in a state in which the second engaging portion rides over the second engaged portion and is elastically restored, thus preventing the conductive component holder from being displaced upward from the connection position.

According to the present aspect, the first engaging portion is engaged with the first engaged portion at the disconnection position, thus preventing the conductive component holder from coming out of the case. Therefore, even when the conductive component holder vehicle is temporarily held at the disconnection position in order to suspend operation for a long period of time, for example, when the vehicle is exported, it is possible to advantageously prevent the conductive component holder from coming out of the case. Moreover, on the inner side of at least one wall portion, the second engaging portion is engaged with the lower surface of the second engaged portion at the connection position in a state in which the second engaging portion has moved over the second engaged portion and is elastically restored, thus preventing the conductive component holder from being displaced upward from the connection position. Accordingly, it is possible to stably maintain the conduction state between the plate metal fitting serving as the conductive component and the dark current circuit. Furthermore, since all of the elastic projecting pieces are configured to be deformed so as to bend inward of the conductive component holder, it is possible to efficiently hold the conductive component holder at the disconnection position and the connection position, without increasing the size of the case.

According to a third aspect of the present invention relating to a dark-current-circuit interruption structure, at least one of the pair of side walls of the conductive component holder includes the first engaging portion provided at a central portion in a width direction of the side wall, and the second engaging portions respectively provided on opposite sides of the first engaging portion in the width direction.

According to the present aspect, at least one of the opposing side walls includes a pair of second engaging portions with the first engaging portion interposed therebetween, and at that portion, the second engaging portions are configured to be engaged with the second engaged portions. Accordingly, the state of engagement of the conductive component holder with the case at the connection position can be further stably maintained.

A first aspect of the present invention relating to an electrical junction box is directed to an electrical junction box including: a dark current circuit; and a case in which the dark current circuit is accommodated. The dark-current-circuit interruption structure according to any one of the first to third aspects is mounted to the case.

According to the present aspect, the dark-current-circuit interruption structure according to any one of the first to third aspects of the dark-current-circuit interruption structure of the present invention is mounted to the case. Accordingly, with the dark-current-circuit interruption structure, it is possible to provide an electrical junction box that can achieve the same effects as the above-described effects.

According to the present invention, the conductive component is formed by a plate metal fitting, and, therefore, there is a larger internal space in the conductive component holder as compared with a conductive component formed by a conventional fuse. Accordingly, a region for allowing bending deformation of the elastic projecting pieces can be secured. Therefore, the elastic projecting pieces are deformed so as to bend in the direction in which the elastic projecting pieces approach each other, or in other words, inward of the conductive component holder. Accordingly, the region that has been conventionally required no longer needs to be provided on the outer side of the case, and it is thus possible to advantageously reduce the size of the case. As a result, the lock mechanism formed by the engaging portion provided on the elastic projecting piece and the engaged portion provided on the wall portion of the case can be provided on a side of each of the pair of opposing side walls of the conductive component holder, without increasing the size of the case. Accordingly, it is possible to stably maintain the state of engagement between the engaging portions of the conductive component holder and the engaged portions of the case, while reducing the size of the case.

EMBODIMENTS OF THE INVENTION

Hereinafter, an embodiment of the present invention will be described with reference to the drawings.

FIGS. 1 to 11 show a structure that uses a dark-current-circuit interruption structure according to an embodiment of the present invention to interrupt a plate metal fitting 14 serving as a conductive component that conductively connects a dark current circuit 12 in a case 10. An electrical junction box 16 is formed by stacking and attaching an upper case and a lower case, which are not shown, onto the case 10 that accommodates the dark current circuit 12, from opposite sides in the vertical direction. In the case 10, a bus bar (not shown) and a connection terminal-equipped wire 18 that form an internal circuit are accommodated, and the dark current circuit 12 is formed by the bus bar (not shown) and a portion of the connection terminal-equipped wire 18 that form the internal circuit. Note that in the following description, "upward" refers to upward in FIG. 1, "downward" refers to downward in FIG. 1, "forward" refers to diagonally downward to the left in FIG. 1, and "rearward" refers to diagonally upward to the right in FIG. 1. In addition, "length direction" refers to the front-rear direction in FIG. 1, and "width direction" refers to a direction orthogonal to the front-rear direction in FIG. 1. To facilitate understanding, the connection terminal-equipped wire 18 is depicted by phantom lines (see FIGS. 7 and 8 and FIGS. 10 and 11).

Figure 1:
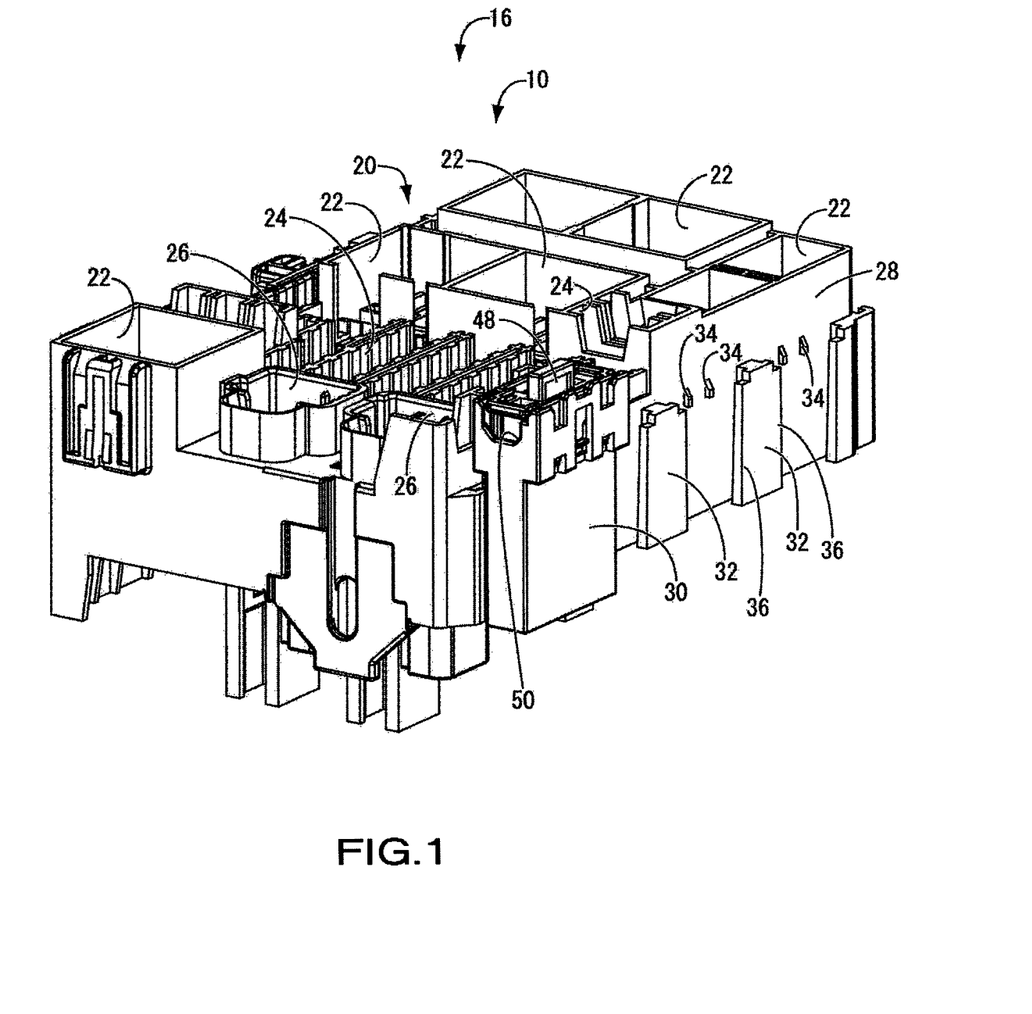
FIG. 1 is a perspective view showing an electrical junction box according to an embodiment of the present invention.

As shown in FIG. 1, the case 10 has the shape of an overall elongated rectangular block, and is formed in one piece through injection molding or the like using an insulating synthetic resin such as polypropylene (PP) or polyamide (PA). As shown in FIG. 1, a plurality of relay attachment portions 22, fuse attachment portions 24, and connector attachment portions 26 are formed open upward on an upper surface 20 of the case 10. A terminal insertion hole (not shown) is formed extending through the bottom surface of each of the relay attachment portions 22, the fuse attachment portions 24, and the connector attachment portions 26, and a connection terminal or the like that is crimped to a connection terminal provided on the bus bar (not shown) or one end (not shown) of the connection terminal-equipped wire 18 is disposed passed through the terminal insertion hole. Then, a fuse, a relay, or a connector, which are not shown, is mounted to each of the relay attachment portions 22, the fuse attachment portions 24, or the connector attachment portions 26 from the upper surface 20 side of the case 10. Thus, a tab terminal protruding from the fuse, the relay, or the connector is connected to the connection terminal, and is conductively connected to the bus bar and the connection terminal-equipped wire 18 that form the internal circuit.

Figure 4A:
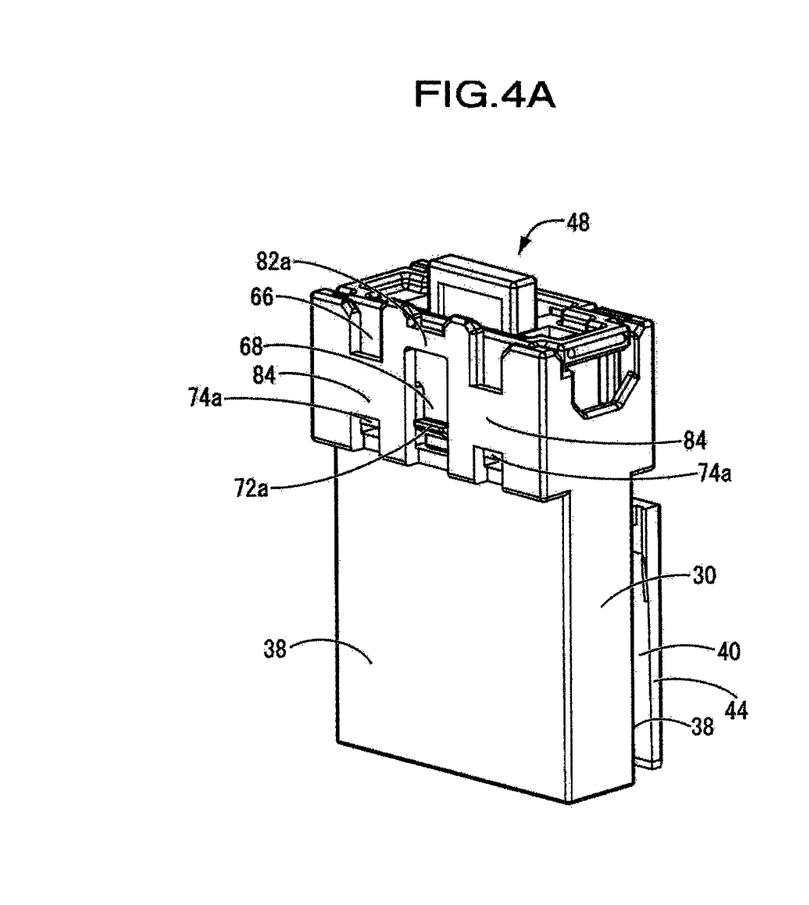
FIG. 4A is a perspective view showing a state in which the conductive component is held at a connection position relative to the conductive component holder shown in FIG. 1, as viewed from one side.
Figure 4B:
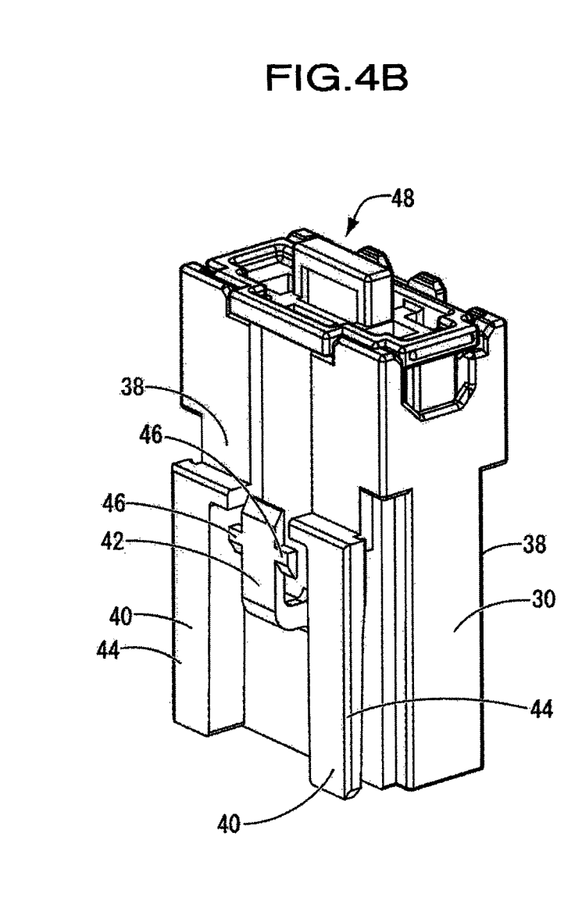
FIG. 4B is a perspective view showing a state in which the conductive component is held at a connection position relative to the conductive component holder shown in FIG. 1, as viewed from the other side.

As shown in FIG. 1, a synthetic resin auxiliary case 30 having the shape of a substantially rectangular block that forms a portion of the case 10 is attached to the case 10 having such a configuration, on the forward side of the front-side side wall 28 extending in the longitudinal direction of the case 10. More specifically, a plurality of attachment ridges 32 having a substantially T-shaped cross-sectional shape, extending in the vertical direction, and being spaced apart from each other in the longitudinal direction, and a pair of attachment projections 34 and 34 being provided on the upper side of the attachment ridges 32 and spaced apart from each other in the longitudinal direction are provided protruding from the side wall 28 of the case 10. The thickness of a protruding distal end portion 36 of each attachment ridge 32 is configured to gradually increase downward, and thus the gap between the protruding distal end portion 36 and the side wall 28 is configured to gradually narrow downward. In addition, each attachment projection 34 has an upper surface formed as a tapered surface that is inclined downwardly outward, and a lower surface formed as a horizontal surface. On the other hand, as shown in FIG. 4B, for example, on opposite sides of a lower portion of one wall portion 38 (on the front side in FIG. 4B) extending in the width direction (the lateral direction in FIG. 9) of the auxiliary case 30, attachment ridge portions 40 each having a substantially inverse L-shaped cross-sectional shape, protruding outward, and extending in the vertical direction, and an attachment projecting portion 42 having the shape of a substantially plate-like cantilever beam, protruding outward from a central portion between the attachment ridge portions 40, and extending upward are provided. Here, the thickness of the attachment ridge portion 40 of each protruding distal end portion 44 is configured to be gradually decrease downward. In addition, the attachment projecting portion 42 includes, in the vicinity of its protruding distal end portion, a pair of engaging projections 46 and 46 protruding outward in the width direction from opposite sides in the width direction (the lateral direction in FIG. 9), and the engaging projections 46 each have an upper surface formed as a horizontal surface and a lower surface formed as a tapered surface that is inclined downward toward the wall portion 38.

By inserting the pair of attachment ridge portions 40 and 40 of the auxiliary case 30 between the desired pair of attachment ridges 32 and 32 of the case 10 from above, with one wall portion 38 of the auxiliary case 30 facing the front-side side wall 28 extending in the longitudinal direction of the case 10, the protruding distal end portions 44 of the attachment ridge portions 40 are stably held in the gap between the protruding distal end portions 36 of the attachment ridges 32 and the side wall 28. That is, the thickness of the protruding distal end portions 44 of the attachment ridge portions 40 is configured to gradually decrease downward, and the gap between the protruding distal end portions 36 of the attachment ridges 32 and the side wall 28 gradually narrows downward, and therefore the protruding distal end portions 44 of the attachment ridge portions 40 can be smoothly inserted into the gap, and are ultimately fitted to and stably held in the gap. Moreover, simultaneously, the pair of engaging projections 46 and 46 of the attachment projecting portion 42 of the auxiliary case 30 move over the pair of attachment projections 34 and 34 of the case 10 and are elastically restored, and the upper surfaces of the engaging projections 46 are engaged with the lower surfaces of the attachment projections 34, thus preventing the auxiliary case 30 from coming loose from/coming off the case 10.

Figure 2A:
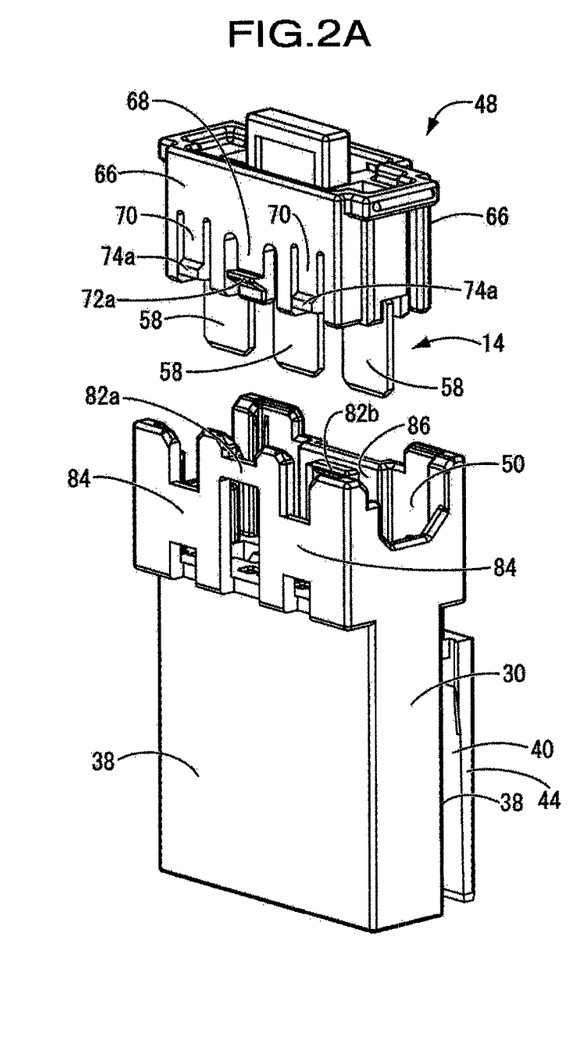
FIG. 2A is a perspective view showing a state before a conductive component is held relative to the conductive component holder shown in FIG. 1, as viewed from one side.
Figure 2B:
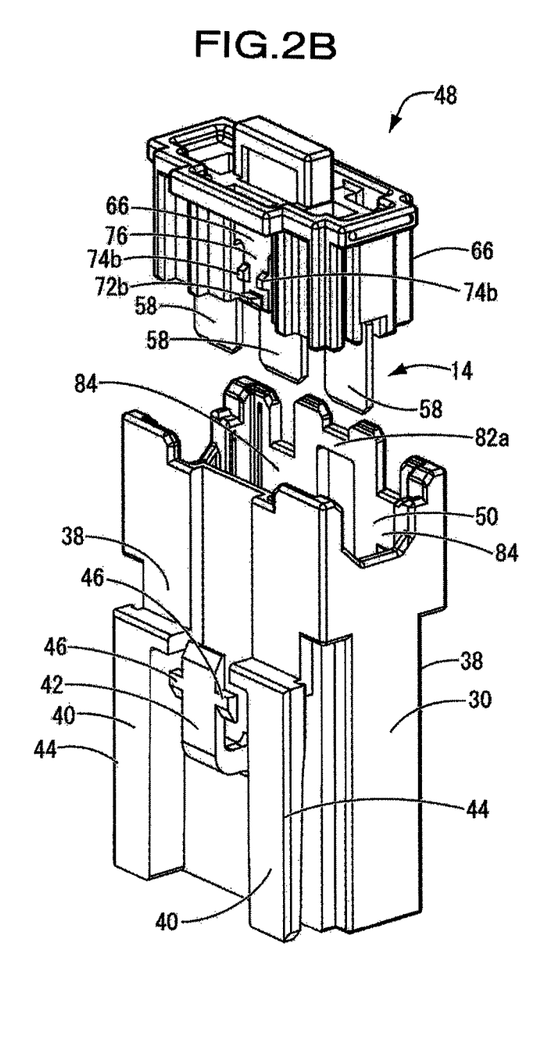
FIG. 2B is a perspective view showing a state before a conductive component is held relative to the conductive component holder shown in FIG. 1, as viewed from the other side.
Figure 3A:
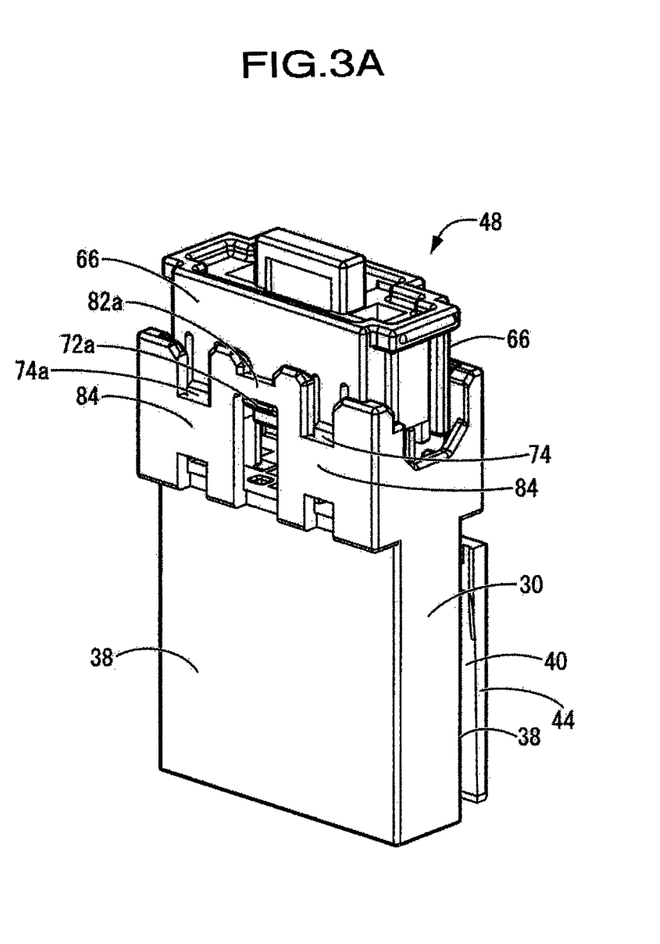
FIG. 3A is a perspective view showing a state in which the conductive component is held at a disconnection position relative to the conductive component holder shown in FIG. 1, as viewed from one side.
Figure 3B:
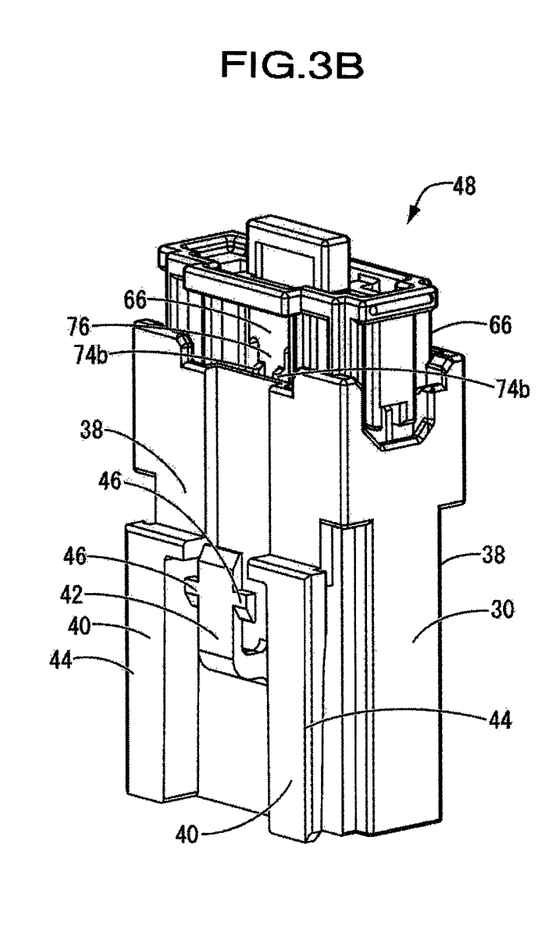
FIG. 3B is a perspective view showing a state in which the conductive component is held at a disconnection position relative to the conductive component holder shown in FIG. 1, as viewed from the other side.

As shown in FIGS. 2A and 2B, for example, a conductive component holder accommodating portion 50 in which the conductive component holder 48 that holds the plate metal fitting 14 serving as the conductive component is accommodated is formed in the auxiliary case 30 so as to be open upward and to have a substantially rectangular shape in plan view. A conductive component terminal insertion hole 52 is formed extending through the bottom surface of the conductive component holder accommodating portion 50, and a connection terminal 54 crimped to an end of the connection terminal-equipped wire 18 that is connected to the dark current circuit 12 and forms a portion of the dark current circuit 12 is disposed so as to pass through the conductive component terminal insertion hole 52 (see FIGS. 7 and 8, and 10 and 11). The connection terminal 54 is stably held in the conductive component terminal insertion hole 52 by being engaged with a lance 56 provided protruding obliquely upwardly inward in the conductive component terminal insertion hole 52.

Figure 5:
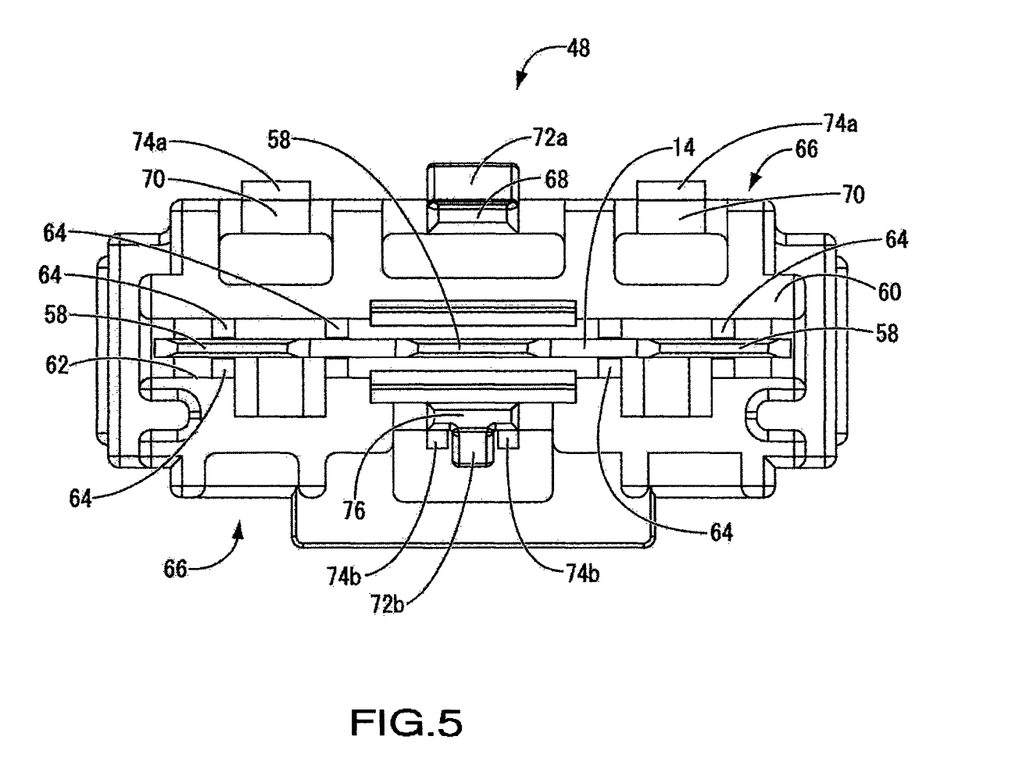
FIG. 5 is a bottom view of the conductive component shown in FIG. 2A.
Figure 6:
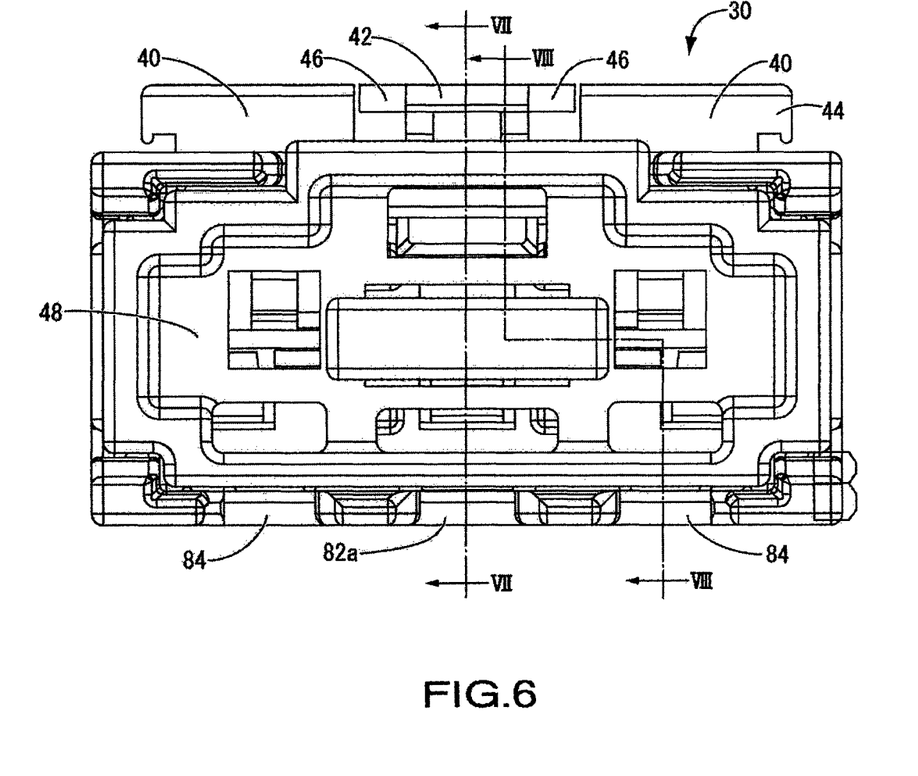
FIG. 6 is a plan view of FIG. 3A.

As shown in FIGS. 2A and 2B, for example, the plate metal fitting 14 serving as the conductive component is held in a conductive component holder 48 that is accommodated in the conductive component holder accommodating portion 50 of the auxiliary case 30. More specifically, in the present embodiment, the plate metal fitting 14 is a bus bar, and is substantially plate shaped overall, and includes three tab terminals 58 and a coupling portion (not shown) that couples the three tab terminals 58 together. The plate metal fitting 14 is formed, for example, by cutting out a metal plate, which is a copper plate or the like and the surface thereof is plated with tin or the like, through processing such as press punching. As shown in FIG. 5, the plate metal fitting 14 having such a configuration is accommodated and held, with the tab terminals 58 facing downward, in a substantially groove-shaped plate metal fitting accommodating portion 62 that is open in a lower surface 60 of the conductive component holder 48 and extends over substantially the entire length thereof in the width direction (the lateral direction in FIG. 5). Retaining ribs 64 are provided protruding inward from the plate metal fitting accommodating portion 62 at eight locations, and the plate metal fitting 14 is prevented from coming out of the plate metal fitting accommodating portion 62 due to the retaining ribs 64 coming into contact with the plate metal fitting 14. The plate metal fitting 14 is configured such that the three tab terminals 58 protrude from the lower surface 60 of the conductive component holder 48 in a state in which the plate metal fitting 14 is accommodated and held in the plate metal fitting accommodating portion 62 (see FIGS. 2A and 2B).

A lock mechanism for stably holding the conductive component holder 48 in the conductive component holder accommodating portion 50 of the auxiliary case 30 is formed on a side wall 66 extending in the width direction (the lateral direction in FIG. 5) of the conductive component holder 48. More specifically, as shown in FIG. 2A, one side wall 66 (on the front side in FIG. 2A) extending in the width direction of the conductive component holder 48 is provided with a substantially rectangular plate-shaped elastic projecting piece 68 protruding downward from a central portion of the side wall 66 in the vertical direction at a central portion in the width direction, and substantially rectangular plate-shaped elastic projecting pieces 70 protruding downward from a central portion of the side wall 66 in the vertical direction on opposite sides of the elastic projecting piece 68.

Figure 7:
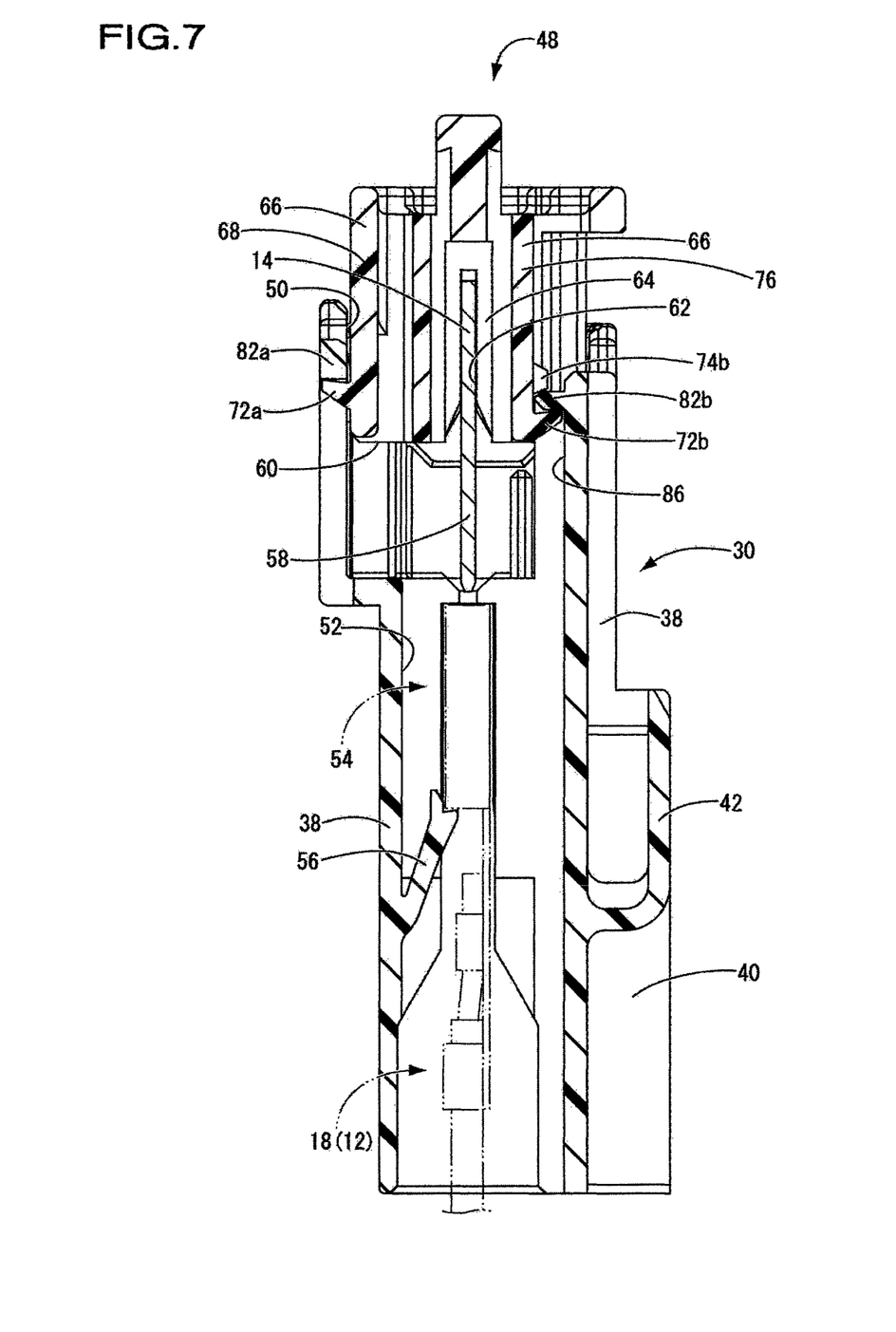
FIG. 7 is a cross-sectional view taken along the line VII-VII in FIG. 6.
Figure 8:
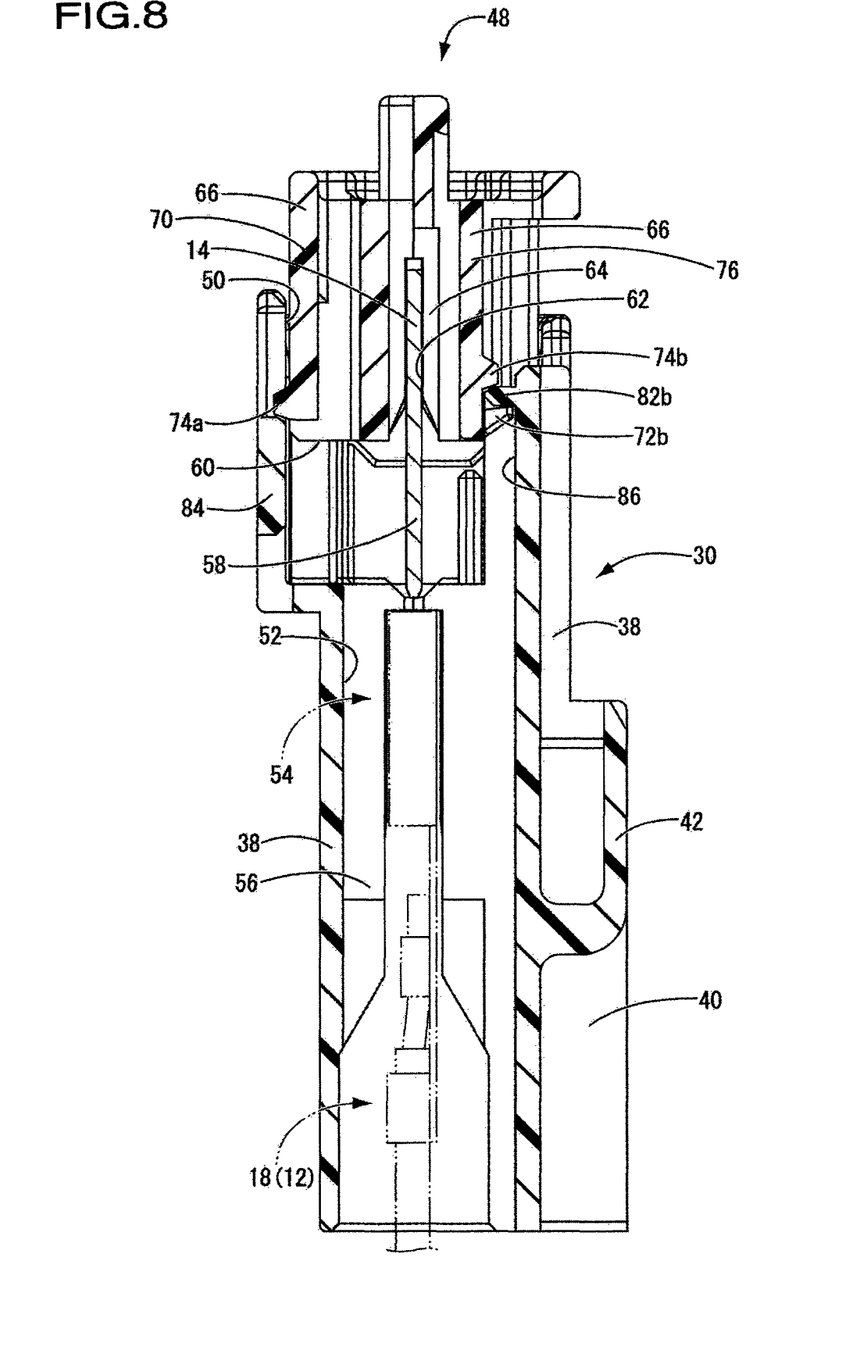
FIG. 8 is a cross-sectional view taken along the line VIII-VIII in FIG. 6.
Figure 9:
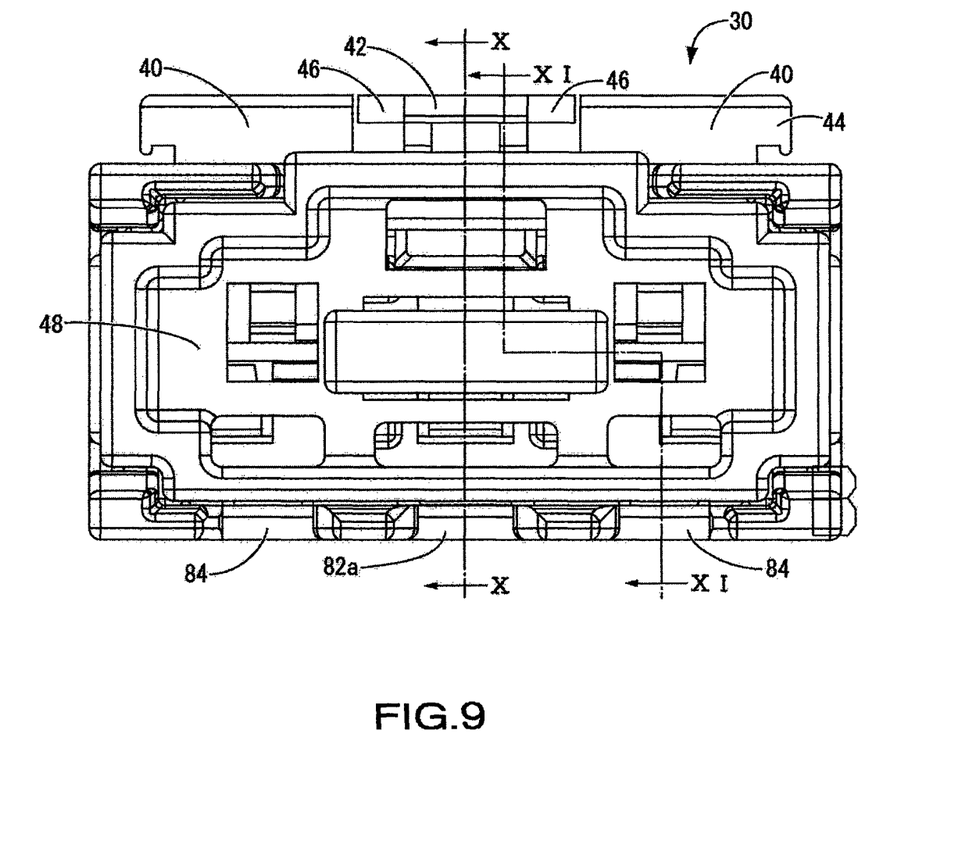
FIG. 9 is a plan view of FIG. 4A.

As shown in FIGS. 7 and 8, the elastic projecting piece 68 and the elastic projecting pieces 70 each have a gap on the inner side thereof, and thus are capable of being elastically deformed inward in the thickness direction (the lateral direction in FIGS. 7 and 8). Moreover, as shown in FIGS. 2A and 7, the protruding end portion of the elastic projecting piece 68 is provided with a first engaging portion 72a serving as an engaging portion protruding outward, having a substantially triangular cross-sectional shape, and extending over the entire length thereof in the width direction, and the first engaging portion 72a has an upper surface formed as a substantially horizontal surface and a lower surface formed as a tapered surface that is inclined downward toward the elastic projecting piece 68. On the other hand, as shown in FIGS. 2 and 8, the protruding end portion of each elastic projecting piece 70 is provided with a second engaging portion 74a serving as an engaging portion protruding outward, having a substantially trapezoidal cross-sectional shape, and extending over the entire length thereof in the width direction, and each second engaging portion 74a has an upper surface formed as a tapered surface that is inclined upward toward the elastic projecting piece 70, and a lower surface formed as a tapered surface that is inclined downward toward the elastic projecting piece 70. The protruding positions of the first engaging portion 72a and the second engaging portion 74a are set to be substantially the same in the vertical direction, and the protruding height of the first engaging portion 72a is set to be larger than the protruding height of the second engaging portions 74a (see FIGS. 2A and 2B).

Similarly, as shown in FIG. 2B, for example, the other side wall 66 (on the front side in FIG. 2B) extending in the width direction (the lateral direction in FIG. 5) of the conductive component holder 48 is provided with a substantially rectangular plate-shaped elastic projecting piece 76 protruding downward from a central portion of the side wall 66 in the vertical direction at a central portion in the width direction. As shown in FIGS. 7 and 8, the elastic projecting piece 76 has a gap on the inner side thereof, and thus can be elastically deformed inward in the thickness direction (the lateral direction in FIGS. 7 and 8). Moreover, as shown in FIGS. 2B and 7, the protruding end portion of the elastic projecting piece 76 is provided with a first engaging portion 72b serving as an engaging portion protruding outward, having a substantially triangular cross-sectional shape, and extending in the width direction, and the first engaging portion 72b has an upper surface formed as a substantially horizontal surface, and a lower surface formed as a tapered surface that is inclined downward toward the elastic projecting piece 76. In addition, the elastic projecting piece 76 includes, on opposite sides, in the width direction, of a slightly upper portion, second engaging portions 74b serving as engaging portions protruding outward, having a substantially trapezoidal cross-sectional shape, and extending in the width direction, and the second engaging portions 74b each have an upper surface formed as a tapered surface that is inclined upward toward the elastic projecting piece 76, and a lower surface formed as a tapered surface that is inclined downward toward the elastic projecting piece 76. Note that the protruding height of the first engaging portion 72b is set to be slightly larger than the protruding height of the second engaging portions 74b (see FIGS. 7 and 8). As described above, as shown in FIGS. 7 and 8, for example, the conductive component holder 48 includes a pair of side walls 66 and 66 that are opposingly positioned on opposite sides in the thickness direction of the plate metal fitting 14 (the lateral direction in FIGS. 7 and 8)

with a gap between the plate metal fitting 14 and each of the side walls 66, and the elastic projecting pieces 68, 70, and 76, and the first engaging portion 72a, the second engaging portions 74a, the first engaging portion 72b, and the second engaging portions 74b are provided on the respective corresponding side walls 66 and 66. The lock mechanism includes the first engaging portion 72a, the second engaging portions 74a, the first engaging portion 72b, and the second engaging portions 74b provided on the elastic projecting pieces 68, 70, and 76 formed on the conductive component holder 48.

On the other hand, as shown in FIGS. 2A and 2B, for example, an upper portion of a wall portion 38 extending in the width direction (the lateral direction in FIG. 6) of the auxiliary case 30 protrudes outward, and a lock mechanism for stably holding the conductive component holder 48 is formed in this portion. More specifically, one wall portion 38 (the front side in FIG. 2A) includes, at a central portion of the wall portion 38 in the width direction, a substantially rectangular plate-shaped first engaged portion 82a at an upper portion of a cut-out portion that is fully cut out in the vertical direction and the thickness direction, the first engaged portion 82a extending over the entire length of the cut-out portion in the width direction. Furthermore, the wall portion 38 includes, on opposite side portions in the width direction thereof, substantially rectangular plate-shaped second engaged portions 84 extending over the entire length in the width direction at a central portion, in the vertical direction, of a cut-out portion that is fully cut out in the vertical direction and the thickness direction. On the other hand, as shown in FIGS. 7 and 8, for example, the other wall portion 38 (the right side in FIGS. 7 and 8) extending in the width direction (the lateral direction in FIG. 6) of the auxiliary case 30 includes, on an inner surface 86 thereof, a first engaged portion 82b serving as an engaged portion that protrudes inward from an upper end portion of a central portion in the width direction, and is to be engaged with the upper surface of the first engaging portion 72b of the elastic projecting piece 76 of the conductive component holder 48, and also with the lower surface of the second engaging portions 74b at a disconnection position, which will be described below. As described above, as shown in FIGS. 7 and 8, for example, the auxiliary case 30 that forms the case 10 includes, on the inner side of the pair of wall portions 38 and 38 respectively opposed to the pair of side walls 66 and 66 of the conductive component holder 48, the first engaged portion 82a, the second engaged portions 84, and the first engaged portion 82b with which the first engaging portion 72a, the second engaging portions 74a, the first engaging portion 72b, and the second engaging portions 74b provided on the conductive component holder 48 are engaged. Also, the lock mechanism includes the first engaged portion 82a, the second engaged portions 84, and the first engaged portion 82b with which the first engaging portion 72a, the second engaging portions 74a, the first engaging portion 72b, and the second engaging portions 74b of the conductive component holder 48 that are provided on the auxiliary case 30 are engaged.

Next, a procedure for mounting the conductive component holder 48 to the auxiliary case 30 serving as the case will be described briefly. First, the bus bar that forms the plate metal fitting 14 serving as the conductive component is attached to the plate metal fitting accommodating portion 62 of the conductive component holder 48, with the tab terminals 58 facing downward (see FIGS. 5 and 7). Subsequently, the conductive component holder 48 to which the conductive component has been attached is inserted from above into the conductive component holder accommodating portion 50 of the auxiliary case 30 (see FIGS. 2A, 2B and 3, and 7 and 8). More specifically, first, the lower surface of the first engaging portion 72a of the elastic projecting piece 68 provided on one side wall 66 (the left side in FIG. 7) of the conductive component holder 48 comes into contact with the upper surface of the first engaged portion 82a. By pushing the conductive component holder 48 further downward in this state, the elastic projecting piece 68 elastically deforms inward to allow further insertion, and the first engaging portion 72a moves over the first engaged portion 82a and is elastically restored. As a result of the first engaging portion 72a being engaged with the lower surface of the first engaged portion 82a in this state, the conductive component holder 48 is prevented from coming out of the auxiliary case 30. At the same time, as a result of the lower surfaces of the second engaging portions 74a of the elastic projecting pieces 70 being placed on the second engaged portions 84 from above so as to be engaged with the second engaged portions 84, the conductive component holder 48 is positioned at a disconnection position relative to the auxiliary case 30 (see FIGS. 7 and 8). That is, as shown in FIGS. 7 and 8, at the disconnection position, the tab terminals 58 of the bus bar that forms the plate metal fitting 14 are not connected to the connection terminal 54 of the dark current circuit 12 that is stably held in the conductive component terminal insertion hole 52 of the auxiliary case 30.

On the other hand, on the other side wall 66 (the right side in FIG. 8) of the conductive component holder 48, first, the lower surface of the first engaging portion 72b of the elastic projecting piece 76 provided on the other side wall 66 of the conductive component holder 48 comes into contact with the upper surface of the first engaged portion 82b. By pushing the conductive component holder 48 further downward in this state, the elastic projecting piece 76 elastically deforms inward to allow further insertion, and the first engaging portion 72b moves over the first engaged portion 82b and is elastically restored. As a result of the first engaging portion 72b being engaged with the lower surface of the first engaged portion 82b in this state, the conductive component holder 48 is prevented from coming out of from the auxiliary case 30. At the same time, as a result of the lower surfaces of the second engaging portions 74b of the elastic projecting piece 76 being engaged with the upper surface of the first engaged portion 82b, the conductive component holder 48 is positioned at the disconnection position relative to the auxiliary case 30 (see FIGS. 7 and 8).

By pushing the conductive component holder 48 further downward from this disconnection state, the elastic projecting pieces 70 elastically deform inward to allow further insertion, and the second engaging portions 74a of the elastic projecting pieces 70 move over the second engaged portions 84 and are elastically restored. As a result of the second engaging portions 74a being engaged with the lower surfaces of the second engaged portions 84 in this state, the conductive component holder 48 is prevented from being displaced upward from the connection position (see FIGS. 10 and 11). That is, at the connection position, the tab terminals 58 of the bus bar that forms the plate metal fitting 14 are conductively connected to the connection terminal 54 of the dark current circuit 12 that is stably held in the conductive component terminal insertion hole 52 of the auxiliary case 30.

Figure 10:
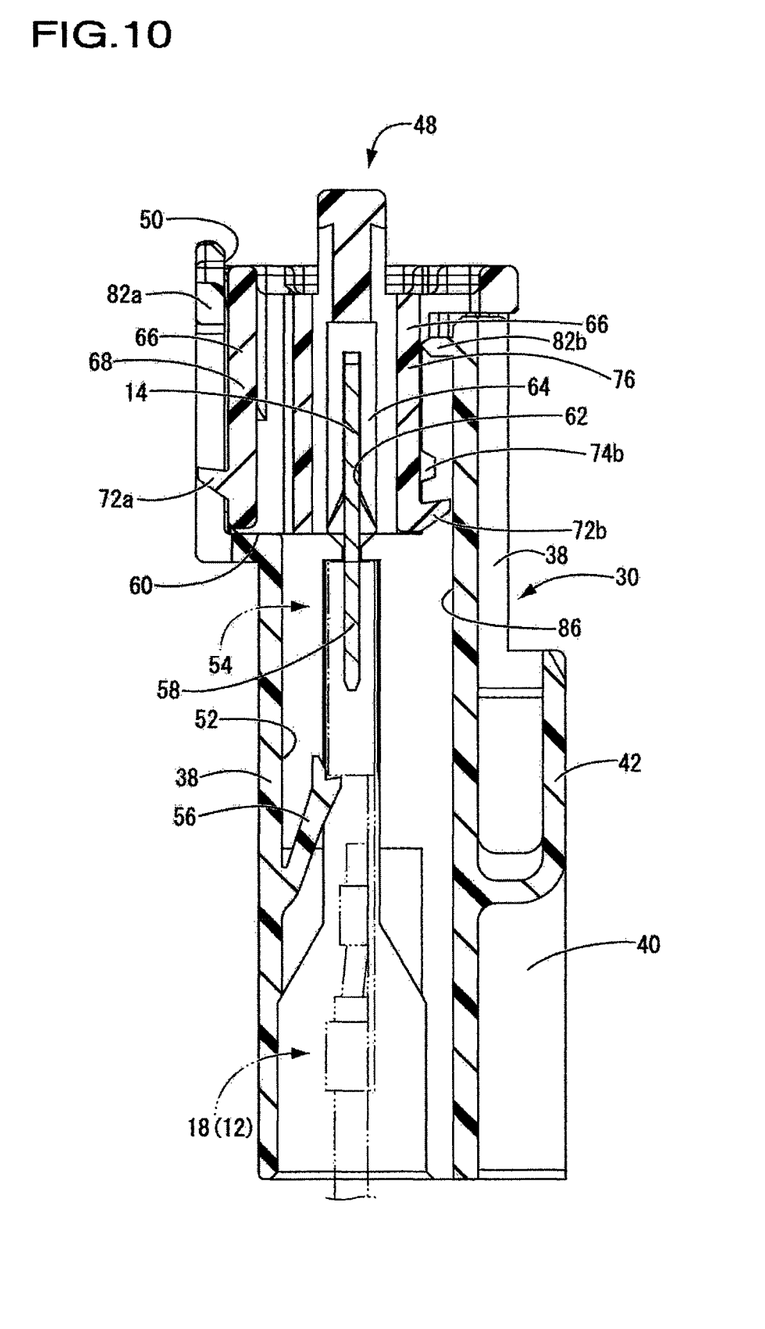
FIG. 10 is a cross-sectional view taken along the line X-X in FIG. 9.
Figure 11:
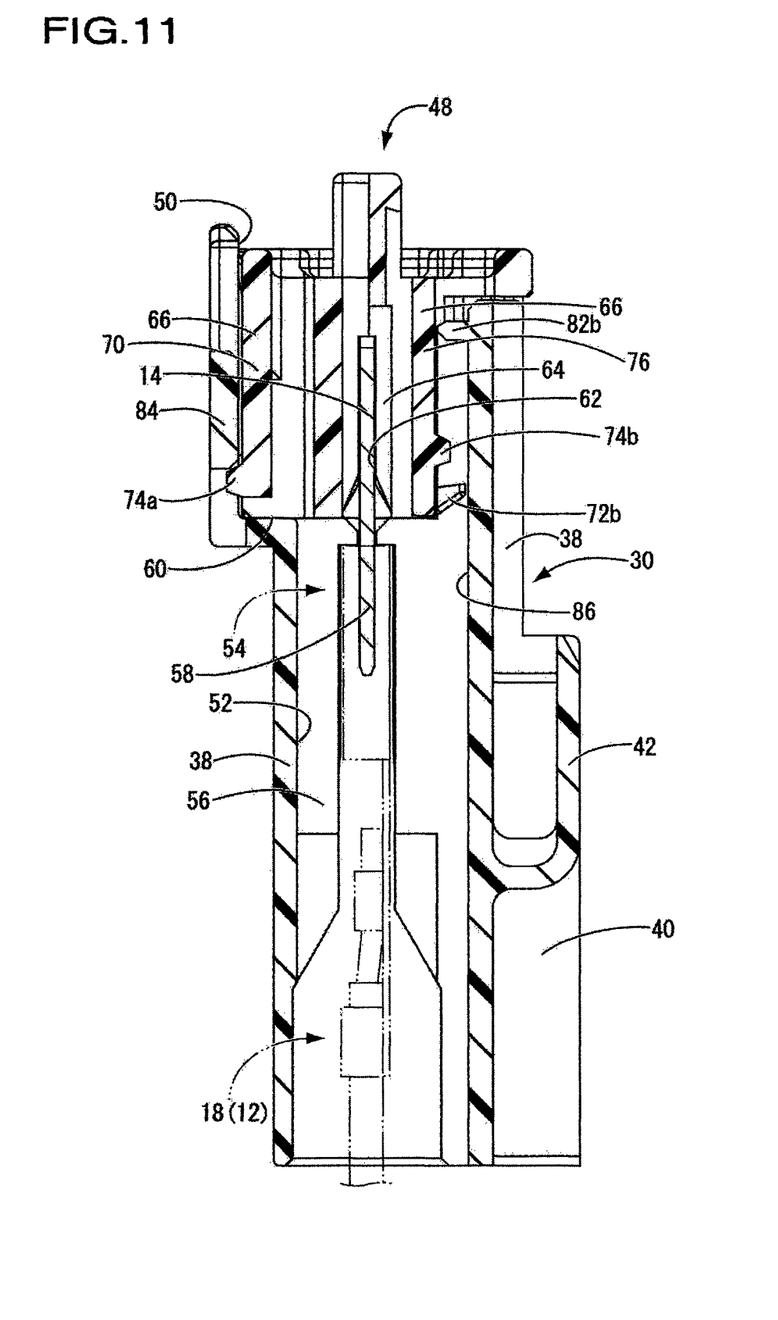
FIG. 11 is a cross-sectional view taken along the line XI-XI in FIG. 9.

On the other hand, on the other side wall 66 of the conductive component holder 48, by pushing the conductive component holder 48 further downward from the disconnection state, the elastic projecting piece 76 elastically deforms inward to allow further insertion, and the second engaging portions 74b move over the first engaged portion 82b and are elastically restored, and are also pushed further downward. In this state, as shown in FIG. 10, the first engaging portion 72b of the elastic projecting piece 76 is in contact with the inner surface of the other wall portion 38 (the right side in FIG. 10) of the conductive component holder 48, and the first engaged portion 82b is in contact with the elastic projecting piece 76, and therefore the conductive component holder 48 is stably held in the conductive component holder accommodating portion 50.

As described above, when attaching the conductive component holder 48 to the auxiliary case 30, the first engaging portion 72a, the second engaging portions 74a, the first engaging portion 72b, and the second engaging portions 74b come into contact with the first engaged portion 82a, the second engaged portions 84, and the first engaged portion 82b and the elastic projecting pieces 68, 70, and 76 elastically deform inward, which is the direction in which the elastic projecting pieces 68, 70, and 76 approach each other, thus allowing insertion of the conductive component holder 48 into the auxiliary case 30, and the elastic projecting pieces 68, 70, and 76 are elastically restored and the first engaging portion 72a, the second engaging portions 74a, the first engaging portion 72b, and the second engaging portions 74b are engaged with the first engaged portion 82a, the second engaged portions 84, and the first engaged portion 82b, thus forming the lock mechanism. Further, the first engaging portion 72a, the second engaging portions 74a, the first engaging portion 72b, and the second engaging portions 74b, and the first engaged portion 82a, the second engaged portions 84, and the first engaged portion 82b that form the lock mechanism allow the conductive component holder 48 to be held so as to be switchable between the connection position at which the plate metal fitting 14 is connected to the dark current circuit 12, and the disconnection position at which the plate metal fitting 14 is disconnected from the dark current circuit 12. Thus, the conductive component holder 48 can be attached displaceably relative to the direction of insertion and removal (the vertical direction in FIGS. 7 and 8, and 10 and 11) of the plate metal fitting 14 into and from the connection terminal 54 of the dark current circuit 12.

With such an interruption structure of a dark-current-circuit fuse according to the present embodiment, the conductive component is formed by the plate metal fitting 14 (the bus bar in the present embodiment) having a smaller thickness than the conventional dark current fuses. Therefore, a region for allowing inward bending deformation of the elastic projecting pieces 68, 70, and 76 can be secured in the internal space of the conductive component holder 48. Accordingly, when attaching the conductive component holder 48 to the auxiliary case 30 in which the dark current circuit 12 is accommodated, the conductive component holder 48 can be deformed so as to bend inward, and the region that has been conventionally required no longer needs to be provided on the outer side of the auxiliary case 30, and it is thus possible to advantageously reduce the size of the auxiliary case 30. Further, the conductive component holder 48 includes the first engaging portion 72a, the second engaging portions 74a, the first engaging portion 72b, and the second engaging portions 74b that are provided on the pair of side walls 66 and 66 that are oppositngly positioned on opposite sides of the plate metal fitting 14 in the thickness direction with a gap in between, and the auxiliary case 30 includes, on the pair of wall portions 38 and 38 that are respectively opposed to the pair of side walls 66 and 66, the first engaged portion 82a, the second engaged portions 84, and the first engaged portion 82b with which the first engaging portion 72a, the second engaging portions 74a, the first engaging portion 72b, and the second engaging portions 74b are engaged. Accordingly, it is possible to stably maintain the state of engagement of the first engaging portion 72a, the second engaging portions 74a, the first engaging portion 72b, and the second engaging portions 74b of the conductive component holder 48 with the first engaged portion 82a, the second engaged portions 84, and the first engaged portion 82b of the auxiliary case 30, while reducing the size of the auxiliary case 30.

Furthermore, at the disconnection position, the first engaging portion 72a is engaged with the lower surface of the first engaged portion 82a, thus preventing the conductive component holder 48 from coming out of the auxiliary case 30. Accordingly, even when the conductive component holder 48 is temporarily held at the disconnection position in order to suspend operation for a long period of time, for example, when the vehicle is exported, it is possible to advantageously prevent the conductive component holder 48 from coming out of the auxiliary case 30. Moreover, on the inner side of one wall portion 38 (the left side in FIG. 11), at the connection position, the second engaging portions 74a are engaged with the lower surfaces of the second engaged portions 84 in a state in which the second engaging portions 74a of the elastic projecting pieces 70 have moved over the second engaged portion 84 and are elastically restored, thus preventing the conductive component holder 48 from being displaced upward from the connection position. Accordingly, it is possible to stably maintain the conduction state between the plate metal fitting 14 serving as the conductive component and the dark current circuit 12. In addition, one of (the front side in FIG. 2A) the opposing side walls 66 of the conductive component holder 48 includes the pair of elastic projecting pieces 70 and 70 with the elastic projecting piece 68 interposed therebetween, and, at that portion, the second engaging portions 74a are engaged with the second engaged portions 84. Accordingly, the state of engagement between the conductive component holder 48 and the auxiliary case 30 at the connection position can be further stably maintained.

Since an electrical junction box 16 is formed as a result of the dark-current-circuit interruption structure according to the present embodiment being mounted to the auxiliary case 30, it is possible to advantageously provide an electrical junction box 16 that can achieve the same effects as those achieved by a dark-current-circuit interruption structure.

Although an embodiment of the present invention has been described above, the invention is by no means intended to be limited by the specific description of the embodiment. For example, in the above embodiment, the conductive component holder 48 is accommodated and held in the auxiliary case 30 that is attached to the case 10; however, a conductive component holder accommodating portion 50 that accommodates and holds the conductive component holder 48 may be provided in the case 10. In the above embodiment, the first engaging portion 72a is provided at a central portion in the width direction only on one of the side walls 66 of the conductive component holder 48, and the second engaging portions 74a are provided on opposite sides of the first engaging portion 72a in the width direction; however, the first engaging portion 72a and the second engaging portions 74a may be provided on both of the side walls 66 of the conductive component holder 48.

LIST OF REFERENCE NUMERALS

10: Case
12: Dark current circuit

14: Plate metal fitting (conductive component)
16: Electrical junction box
30: Auxiliary case (case)
38: Wall portion
48: Conductive component holder
54: Connection terminal
66: Side wall
68: Elastic projecting piece
70: Elastic projecting piece
72a, 72b: First engaging portion (engaging portion) (lock mechanism)
74a, 74b: Second engaging portion (engaging portion) (lock mechanism)
76: Elastic projecting piece
82a, 82b: First engaged portion (engaged portion) (lock mechanism)
84: Second engaged portion (engaged portion) (lock mechanism)

What is claimed is:

1. A dark-current-circuit interruption structure comprising:
   a lock mechanism configured to:
      attach, to an auxiliary case that accommodates a dark current circuit, a conductive component holder that holds a conductive component that conductively connects the dark current circuit such that the conductive component holder can be displaced relative to a direction of insertion and removal of the conductive component into and from a connection terminal of the dark current circuit; and
      hold the conductive component holder so as to be switchable between a connection position at which the conductive component is connected to the dark current circuit and a disconnection position at which the conductive component is disconnected from the dark current circuit, the lock mechanism including engaging portions provided on elastic projecting pieces formed on the conductive component holder, and engaged portions that are provided on the auxiliary case, and with which the engaging portions are to be engaged,
   wherein the conductive component is formed by a plate metal fitting,
   the conductive component holder includes at least one of the elastic projecting pieces and at least one of the engaging portions provided on each of a pair of side walls opposingly positioned on opposite sides in a thickness direction of the plate metal fitting with a gap between the plate metal fitting and each of the side walls,
   the auxiliary case includes at least one of the engaged portions on an inner side of each of a pair of wall portions that are respectively opposed to the pair of side walls, and,
   when attaching the conductive component holder to the auxiliary case, the engaging portions and the engaged portions are configured to come into contact with each other to cause the elastic projecting pieces to elastically deform in a direction in which the elastic projecting pieces approach each other, thus allowing insertion of the conductive component holder into the auxiliary case, and the engaging portions are configured to be engaged with the engaged portions due to elastic restoration of the elastic projecting pieces.

2. The dark-current-circuit interruption structure according to claim 1, wherein
   the engaging portions each include a first engaging portion and a second engaging portion, and the engaged portions each include a first engaged portion with which the first engaging portion is configured to be engaged, and a second engaged portion with which the second engaging portion is configured to be engaged on an inner side of at least one of the wall portions,
   at the disconnection position, the first engaging portion is configured to be engaged with a lower surface of the first engaged portion in a condition in which the first engaging portion has moved over the first engaged portion and is elastically restored, thus preventing the conductive component holder from coming out of the auxiliary case, and the second engaging portion is configured to be placed on the second engaged portion from above, thus positioning the conductive component holder at the disconnection position relative to the auxiliary case, and,
   at the connection position, the second engaging portion is configured to be engaged with a lower surface of the second engaged portion in a condition in which the second engaging portion has moved over the second engaged portion and is elastically restored, thus preventing the conductive component holder from being displaced upward from the connection position.

3. The dark-current-circuit interruption structure according to claim 2, wherein
   at least one of the pair of side walls of the conductive component holder includes the first engaging portion provided at a central portion in a width direction of the side wall, and the second engaging portions are respectively provided on opposite sides of the first engaging portion in the width direction.

4. An electrical junction box comprising:
   a dark current circuit; and
   a case in which the dark current circuit is accommodated,
   wherein the dark-current-circuit interruption structure according to claim 1 is mounted to the case.

* * * * *